United States Patent [19]

Jones

[11] Patent Number: 5,169,161
[45] Date of Patent: Dec. 8, 1992

[54] SYMMETRICAL GASKET FOR PIPE JOINTS

[75] Inventor: William D. Jones, Warrington, Pa.

[73] Assignee: Hail Mary Rubber Co., Inc., Warrington, Pa.

[21] Appl. No.: 762,389

[22] Filed: Sep. 19, 1991

[51] Int. Cl.$^5$ ............................................. F16J 15/00
[52] U.S. Cl. ............................. 277/207 A; 277/186; 277/208; 277/DIG. 2; 285/110; 285/230; 285/910
[58] Field of Search ................. 277/207 A, 165, 186, 277/207 R, 208, DIG. 2; 285/110, 113, 910, 230, 231, 245

[56] References Cited

U.S. PATENT DOCUMENTS

| | | | |
|---|---|---|---|
| 2,265,615 | 12/1941 | Stalter . | |
| 2,271,777 | 2/1942 | Nathan . | |
| 2,451,070 | 10/1948 | Chamberlain | 277/208 |
| 2,607,966 | 8/1952 | Beck . | |
| 2,809,853 | 10/1957 | Nathan | 277/207 A |
| 2,882,073 | 4/1959 | James . | |
| 2,897,533 | 8/1959 | Bull et al. . | |
| 3,016,722 | 1/1962 | Batdorf | 277/208 |
| 3,020,054 | 2/1962 | Driancourt | 277/207 A |
| 3,046,028 | 7/1962 | Nathan | 277/207 A |
| 3,048,415 | 8/1962 | Shook | 277/208 |
| 3,057,408 | 10/1962 | Griffitts . | |
| 3,124,040 | 3/1964 | Fiedler . | |
| 3,150,876 | 9/1964 | Lafferty . | |
| 3,249,685 | 5/1966 | Heflin, Jr. | 285/110 X |
| 3,317,214 | 5/1967 | Durgom | 277/207 A |
| 3,386,745 | 6/1968 | Hein . | |
| 3,787,061 | 1/1974 | Yoakum | 277/164 |
| 3,829,107 | 8/1974 | Machado et al. | 277/207 A X |
| 3,891,224 | 6/1975 | Ditcher | 285/230 X |
| 3,907,310 | 9/1975 | Dufour | 277/92 |
| 3,998,478 | 12/1976 | Zopfi | 285/110 |
| 4,003,591 | 1/1977 | Schuldink | 285/110 |
| 4,186,931 | 2/1980 | Anderson | 277/207 A |
| 4,333,662 | 6/1982 | Jones | 277/207 A |
| 4,343,480 | 8/1982 | Vassallo | 277/207 A |
| 4,346,921 | 8/1982 | Gill et al. | 285/110 |
| 4,565,381 | 1/1986 | Joelson | 277/207 A |
| 4,641,858 | 2/1987 | Roux | 285/94 |
| 4,664,421 | 5/1987 | Jones | 285/110 |
| 4,666,165 | 5/1987 | Nordin | 277/207 A |
| 4,726,611 | 2/1988 | Sauer | 285/110 |
| 4,735,440 | 4/1988 | Sauer | 285/110 |
| 4,789,167 | 12/1988 | Housas | 277/207 A |
| 4,865,354 | 9/1989 | Allen | 285/18 |
| 4,871,180 | 10/1989 | Preisendorfer | 277/207 A |
| 4,906,010 | 3/1990 | Pickering et al. | 277/207 A |
| 4,915,422 | 4/1990 | Chacon et al. | 285/39 |
| 4,984,831 | 1/1991 | Bengtsson | 285/379 |

FOREIGN PATENT DOCUMENTS

| | | | |
|---|---|---|---|
| 1129344 | 5/1962 | Fed. Rep. of Germany ... | 277/207 A |
| 2407647 | 9/1974 | Fed. Rep. of Germany ... | 277/207 A |
| 3232075 | 3/1984 | Fed. Rep. of Germany ... | 277/207 A |
| 1401472 | 4/1965 | France | 277/208 |
| 0615708 | 1/1961 | Italy | 277/208 |
| 0288139 | 1/1963 | Netherlands | 277/208 |
| 1578734 | 11/1980 | United Kingdom | 277/207 A |
| 2123904 | 2/1984 | United Kingdom | 277/207 R |

Primary Examiner—Thomas B. Will
Assistant Examiner—James K. Folker
Attorney, Agent, or Firm—Howson and Howson

[57] ABSTRACT

A symmetrical elastomeric seal for providing a fluid-tight joint in the annular space between the spigot of one pipe and the bell of an adjoining pipe. The gasket includes tapered ribs projecting from an annular web with their peripheries forming a continuous raised rim. The ribs are symmetrically tapered about axially-spaced parallel planes. A clamp may be installed between adjacent ribs to positively secure the gasket on the spigot. The hardness of the elastomer in the web relative to the ribs may vary according to the fluid pressure of the joint.

7 Claims, 2 Drawing Sheets

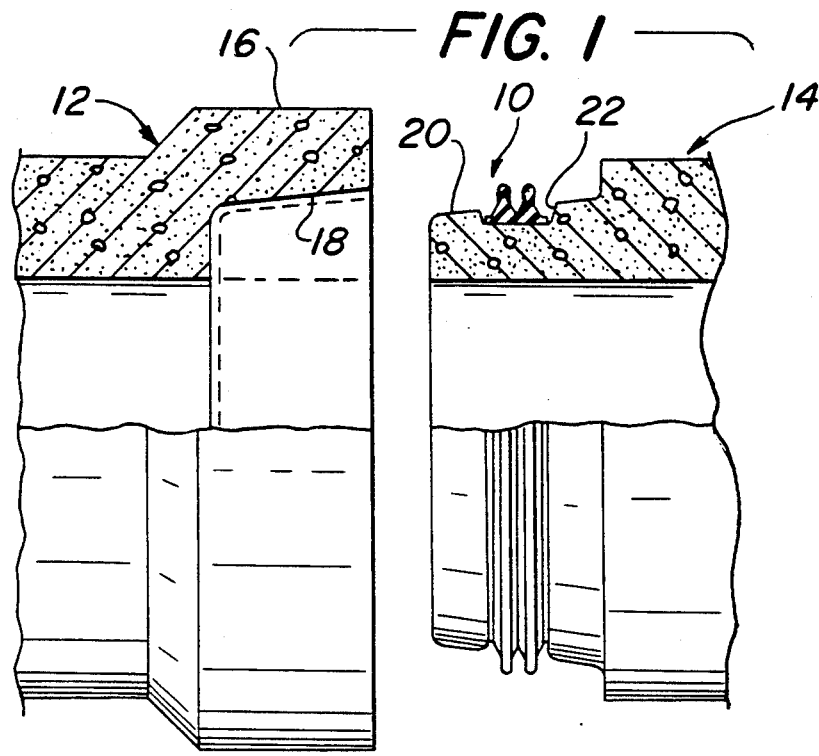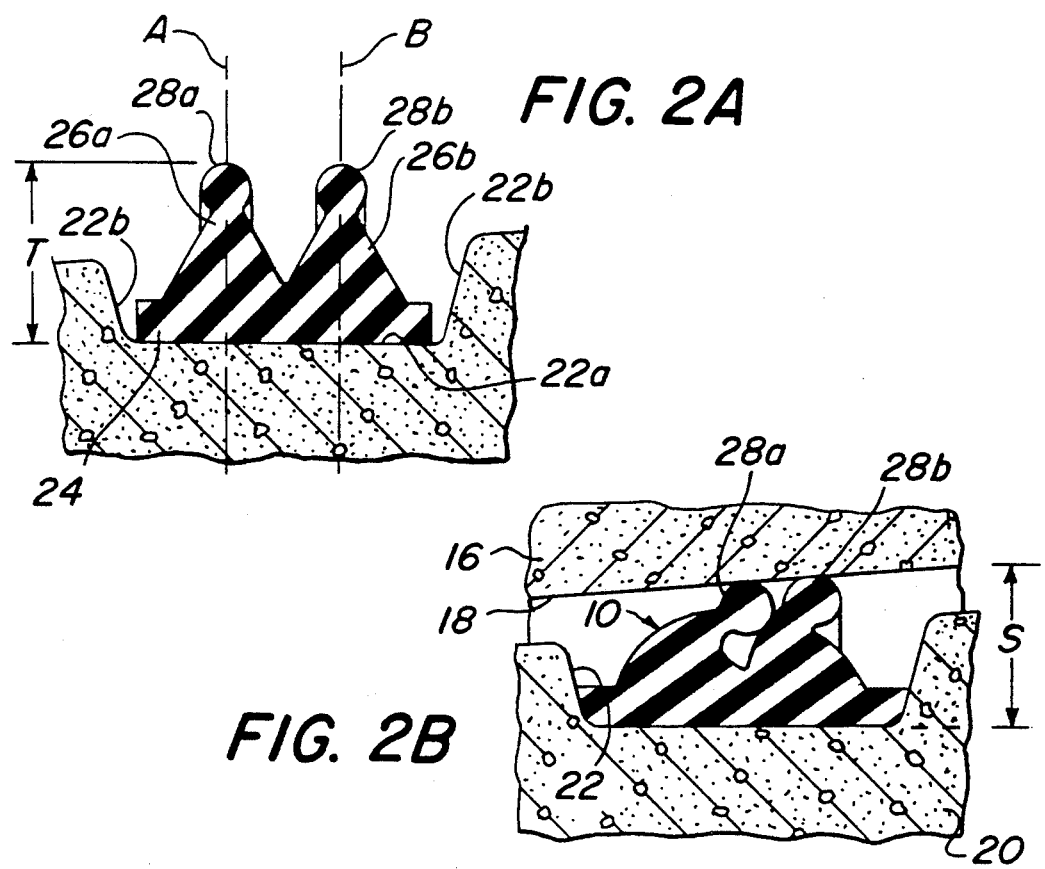

SYMMETRICAL GASKET FOR PIPE JOINTS

BACKGROUND OF THE INVENTION

The present invention relates generally to flexible fluid-tight seals for pipe joints, and more particularly to a novel and improved gasket particularly suited for sealing bell and spigot joints of round concrete sewer and culvert pipes.

Pipe joints, particularly those encountered in concrete sewer and culvert pipes are fabricated in many configurations and sizes to meet specific requirements and users' preferences, the most common being the bell-and-spigot joint. Sufficient clearance is provided at the joint for a sealant such as an O-ring gasket, caulking or the like depending upon the nature and pressure of the fluid being conveyed. Some sealants are integrally installed at the factory during fabrication of the pipes, while others are simply applied at the job site. For very large diameter concrete pipes, such as in storm and sanitary sewer systems, field installation of the gaskets is frequently preferred.

The O-ring gasket is used, but with limited success, particularly with respect to large diameter pipe joints. The O-ring is typically mounted on the spigot, and the spigot is then pushed into the bell causing the O-ring to roll further onto the spigot until it reaches roughly the center of the pipe connection. Dirty or uneven surfaces, poor or improperly applied lubricants, misaligned pipes, and excessive force may cause the O-ring to distort non-uniformly resulting in weak seals or even total gaps. Some pipe spigots include a circumferential groove or a single- or double- offset shoulder to keep the O-ring from rolling as the pipes are interconnected. However, the diameter of the O-ring in radial cross section is usually greater than the depth of the groove or shoulder and the ring may still roll over the inside edge of the groove, become snagged or shear off segments of the O-ring as the spigot enters the bell.

Various gasket configurations have been used or suggested for overcoming these deficiencies. For example, U.S. Pat. No. 4,565,381 to Joelson discloses a rib-type angular gasket suitable for grooved or offset concrete pipe spigots. For providing self-alignment, the gasket includes a base with inner, intermediate and outer sealing ribs of incrementally increased outside diameter. U.S. Pat. No. 2,271,777 to Nathan and U.S. Pat. No. 2,882,073 to James show similar rib-type gasket configurations for bell-and-spigot pipe joints. In each of these gaskets, it is essential that they be placed on the spigot with the inner or smallest diameter rib closest to the end of the spigot. The ribs of the Nathan and James gaskets are also slightly inclined outwardly to prevent the pipes from separating.

The elasticity of the rib-type gasket also serves conflicting or cross-purposes. For example, high fluid pressure conditions require a relatively hard rubber in order for the ribs to maintain a tight seal, but the hardness makes th gasket difficult to stretch onto a spigot. Consequently a softer rubber gasket would be preferred because it is easier to install, but the ribs may be too soft to withstand high pressure conditions.

SUMMARY OF THE INVENTION

Accordingly, it is an object of the present invention to provide a novel and improved gasket for use in flexible watertight bell-and-spigot pipe joints.

Another object is to provide a gasket which is particularly suitable for mounting on concrete storm or sanitary sewer pipes characterized by a circumferential groove or offset spigot, and which can be installed in either axial orientation on a spigot.

Still another object is to provide a gasket which meets specifications of applicable industry standards for rubber gaskets used in circular concrete sewer and culvert pipe joints.

A further object is to provide a seal suitable for high and low pressure pipe joints which is easy to install on a spigot.

These and other objects of the invention are accomplished with an improved elastomeric gasket which, in an unstressed state, defines tapered ribs projecting from an annular web with the periphery of each rib having a continuous raised rim. In radial cross section, the opposite sides of the ribs are symmetrical about respective axially-spaced parallel planes in order that the gasket can be installed in either axial orientation. The web is formed to fit in standard O-ring grooves or offsets in pipe spigots. As the spigot is inserted in a mating pipe bell, the ribs deflect and the base compresses providing a positive seal and resistance to backing out. A clamp ring may be applied between adjacent ribs for positive adherence of the gasket on the spigot. The gasket composition may have discrete portions of different elasticities for high and low pressure applications.

For a better understanding of these and other objects of the invention, reference will be made to the following detailed description taken in conjunction with the accompanying drawings.

BRIEF DESCRIPTION OF THE DRAWINGS

FIG. 1 is a view in partial radial cross section of a bell and spigot of adjacent pipes aligned for joining with a gasket according to the invention installed in an O-ring groove of a pipe spigot;

FIGS. 2A and 2B are enlarged views in radial cross section of the gasket of FIG. 1 before and after the pipes are joined;

DESCRIPTION OF THE PREFERRED

Figure 3:
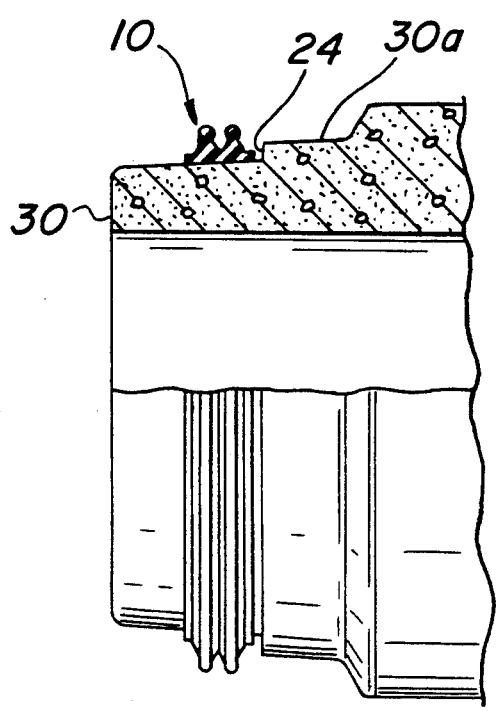
FIG. 3 shows the gasket of FIG. 1 in partial radial cross-section installed on a single offset spigot.

Referring now to the drawings wherein like reference characters designate like or corresponding parts throughout the several views, there is illustrated in FIG. 1 one embodiment of a pipe gasket 10 for providing a fluid seal between concrete pipe ends 12 and 14. The end of pipe 12 includes a bell 16 defining a slightly tapered counterbore 18 for receiving, with nominal radial clearance, a matching tapered spigot 20 on the end of pipe 14. Gasket 10 is retained on spigot 20 in a circumferential groove 22. As best seen in FIG. 2A, groove 22 is defined by a shallow flat bottom 22a and outwardly sloping sides 22b. The annular space S (FIG. 2B) between the gasket-bearing surfaces of the assembled and centered pipes 12 and 14 preferably does not exceed 75% of the uncompressed thickness T (FIG. 2A) of gasket 10.

Referring to FIG. 2A, gasket 10 is an extruded or molded homogeneous solid elastomers such as natural rubber, synthetic rubber or a blend of both. It comprises an annular base or web 24 formed about a longitudinal axis with two substantially identical fins or ribs 26a and 26b projecting radially outwardly along axially-spaced parallel planes A and B, respectively, normal to the longitudinal axis. In radial cross section, the sides of each rib 26a and 26b taper symmetrically about their respective planes A and B and terminate in a raised circular portion or substantially toroidal lip to form a continuous rim 28a and 28b projecting from each side of ribs 26A and 26B.

Ribs 26a and 26b, being symmetrical about planes A and B, gasket 10 may be installed on spigot 20 in either axial orientation and achieve the same sealing effect. As shown in FIG. 2B, when bell 16 and spigot 20 are fully joined, ribs 26a and 26b deflect in the direction opposite of insertion with rim 28a compressing against the proximal side of rib 26b. The sides of web 24 may also compress against the groove sides 22b further ensuring positive sealing at the pipe joint. With ribs 26a and 26b deflected in the manner shown in FIG. 2B, it is difficult for pipe 14 to back out of bell 16.

Figure 4:
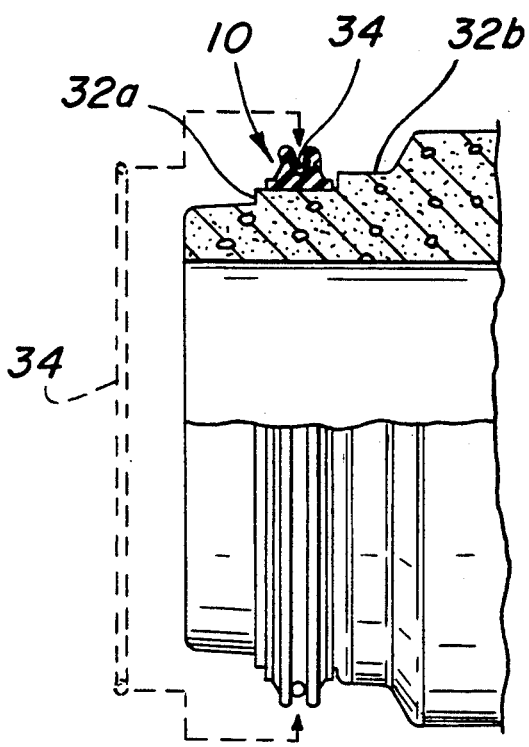
FIG. 4 shows the gasket of FIG. 1 in partial radial cross-section installed on a double offset spigot with a retaining ring.

FIG. 3 shows gasket 10 installed on a single offset spigot 30 with its web 24 abutting the shoulder of an offset 30a; and FIG. 4 shows gasket 10 installed on a double offset spigot 32 with its web 24 around the circumference of an inner offset 32a and abutting the shoulder of an outer offset 32b. An optional clamp ring 34 tightened around gasket 10 in the root of a V-shaped notch formed between ribs 26a and 26b provides added resistance to slippage.

Figure 5:
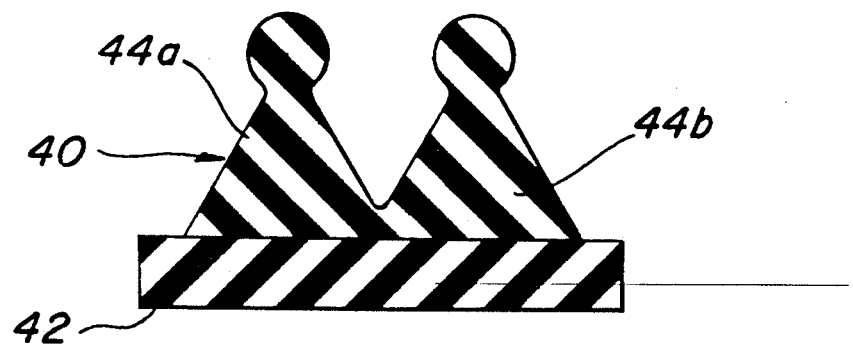
FIG. 5 illustrates in radial cross-section an alternate embodiment of a gasket according to the invention having discrete portions of different elasticities.

FIG. 5 represents another embodiment according to the invention. A gasket 40 having substantially the same cross sectional configuration as gasket 10 except it comprises two elastomers of different elasticities preferably molded or extruded together to form an intimately bonded interface. Base portion 42 has a uniform hardness different from ribs 44a and 44b to accommodate their specific requirements for the gasket. For example, a low fluid-pressure joint, may permit a relatively low hardness such as 40 Shore Durometers in ribs 44a and 44b, for ease of inserting the spigot, but a base 42 with a hardness such as 60 Shore Durometers, to ensure tight adherence around the spigot. Conversely, a high fluid pressure joint may require hard ribs 44a and 44b but permit a soft base 42 for ease in stretching the gasket onto the spigot.

Some of the many advantages and novel features of the invention should now be readily apparent. For example, an improved gasket for sealing the joints of circular concrete sewer and culvert pipe sections is provided which can be readily mounted on a spigot in either axial orientation with equal sealing capability while retaining resistance to backing out of the mating bell. The gasket is particularly suitable for use in joints designed for O-ring gaskets, and on single or double offset spigots. The gasket is capable of meeting the specifications and standards of industry. It may be fabricated with uniform hardness or with plural hardnesses to satisfy specific fluid pressure applications.

It will be understood that various changes in the details, materials, steps and arrangement of parts, which have been herein described and illustrated in order to explain the nature of the invention, may be made by those skilled in the art within the principle and scope of the invention as expressed in the appended claims.

I claim:

1. An improved gasket for sealing the annular space in a bell-and-spigot pipe joint, the improvement comprising:
    a continuous elastomeric web formed about a longitudinal axis, said web having an inner peripheral surface formed to sealingly engage the outer periphery of a spigot; and
    a plurality of identical elastomeric ribs integrally formed with and projecting radially outward from said web in parallel planes spaced along and normal to the longitudinal axis, each of said ribs having in radial cross section a tapered portion with opposite sides symmetrical about a respective one of said planes and terminating with a substantially toroidal rim, said rim having surfaces projecting from said opposite sides for deflecting with said tapered portion to engage the inner periphery of a bell and the proximal side of an adjacent one of said ribs;
    whereby the gasket can be installed in the pipe joint in either direction along the longitudinal axis.

2. A gasket according to claim 1 wherein said web is sized to pack substantially a circumferential groove formed in the spigot.

3. A gasket according to claim 1 wherein the hardness of said web is less then of said ribs.

4. In a pipe joint between the bell of one pipe and the spigot of an adjoining pipe, an annular elastomeric seal comprising:
    a plurality of identical tapered means radially extending from a web means in parallel-spaced planes along the longitudinal axis of the seal, said web means formed for sealingly engaging the spigot, and each of said tapered means having sides symmetrical about the respective plane and terminating in a continuous raised tip with surfaces projecting from said sides for sealingly engaging the bell and compressing against the proximal side of the adjacent one of said tapered means.

5. A seal according to claim 4 wherein the hardness of said web means is less than that of said tapered means.

6. A symmetrical gasket for sealing an annular joint, comprising:
    a continuous elastomeric web formed about a longitudinal axis; and
    a plurality of identical elastomeric ribs integrally formed with and projecting radially outward from said web in parallel planes spaced along and normal to the longitudinal axis, each of said ribs having in radial cross section a tapered portion with opposite sides symmetrical about a respective one of said planes and terminating in a substantially toroidal rim, said rim having surfaces projecting from said opposite sides for deflecting with said tapered portion and engaging the inner periphery of a bell and the facing side of an adjacent rib.

7. A gasket according to claim 6 wherein the hardness of said web is less than that of said ribs.

* * * * *